Patented May 16, 1939

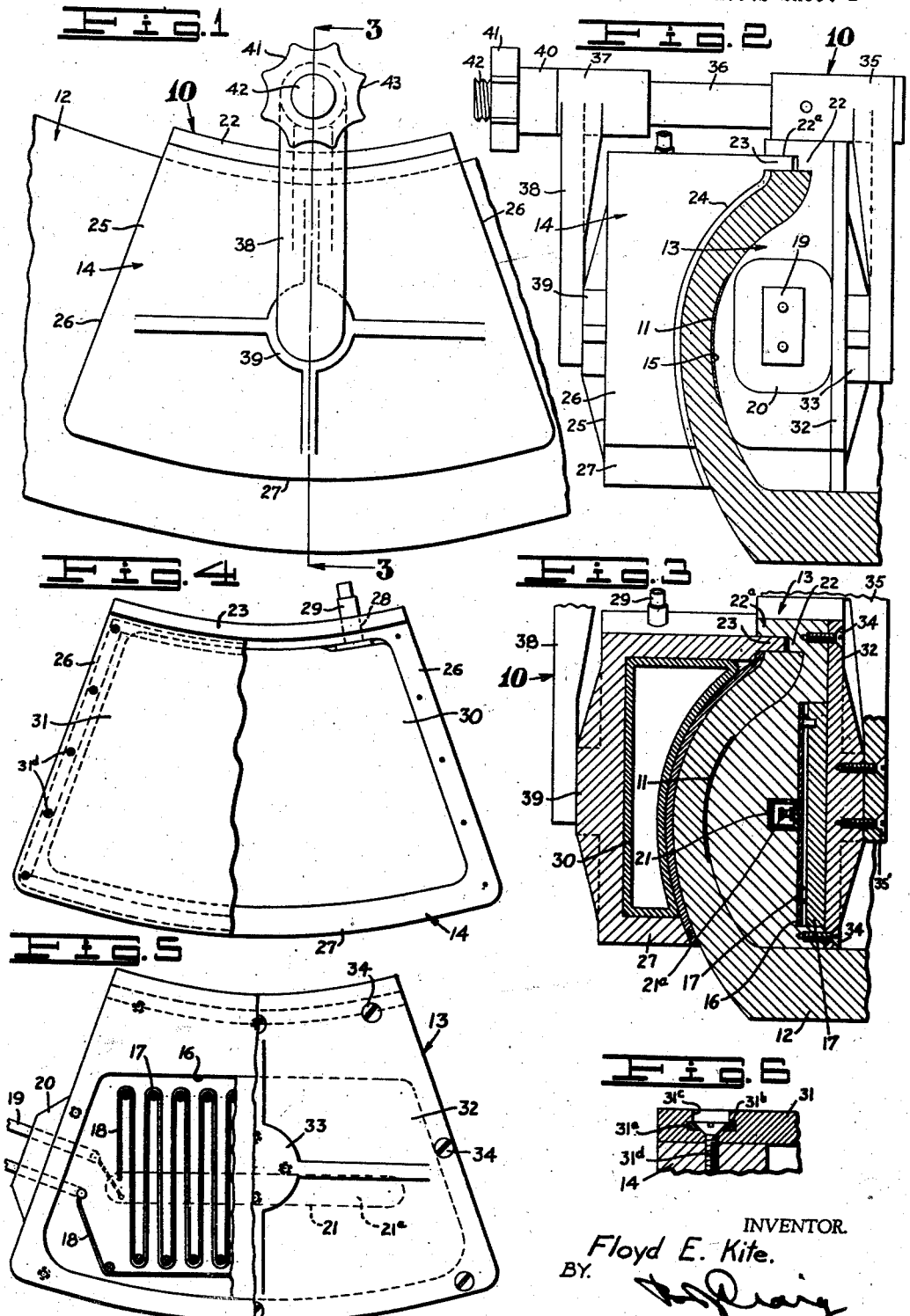
May 16, 1939.  F. E. KITE  2,158,703
PATCH VULCANIZING APPARATUS
Filed June 15, 1937   2 Sheets-Sheet 1
INVENTOR.
Floyd E. Kite.
BY
ATTORNEY.

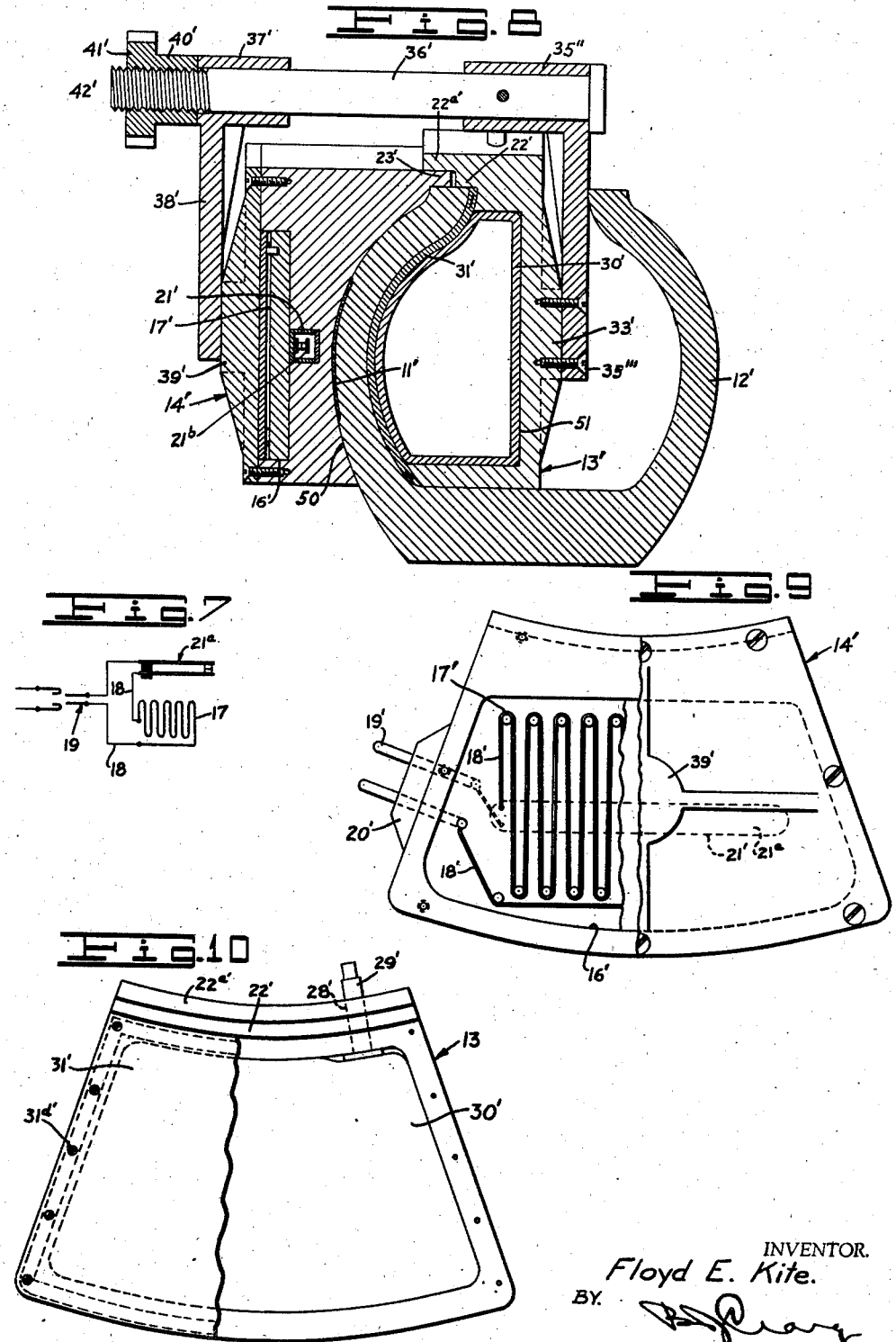

2,158,703

UNITED STATES PATENT OFFICE 2,158,703

PATCH VULCANIZING APPARATUS

Floyd E. Kite, Los Angeles, Calif.

Application June 15, 1937, Serial No. 148,295

6 Claims. (Cl. 18—18)

This invention relates to patch vulcanizing apparatus.

The general object of the invention is to provide a novel apparatus by means of which a patch may be secured in place and vulcanized to the casing of an automobile tire.

Another object of the invention is to provide a patch vulcanizing apparatus wherein the apparatus engages only one side of a tire casing.

An additional object of the invention is to provide a tire vulcanizing apparatus including an inner and an outer member both having similarly shaped opposed walls adapted to engage a segmental portion of a tire casing and wherein one of the portions includes an air bag and the other a heating element.

Another object of the invention is to provide a novel apparatus for vulcanizing a patch on the outside of a tire casing.

Another object of the invention is to provide a novel apparatus for vulcanizing a patch on the interior of an automobile tire casing.

An additional object of the invention is to provide a novel mold member for use in vulcanizing a patch on an automobile tire casing.

Other objects and the advantages of my invention will be apparent from the following description taken in connection with the accompanying drawings, wherein:

Fig. 1 is a side elevation showing my apparatus as engaged on a portion of an automobile tire casing;

Fig. 2 is an end view of the apparatus with a tire casing thereon shown in cross section.

Fig. 3 is a fragmentary sectional view taken on line 3—3 Fig. 1;

Fig. 4 is a front view, partly broken away, showing the outer member;

Fig. 5 is a front view partly broken away showing the inner mold member;

Fig. 6 is a sectional detail;

Fig. 7 is a wiring diagram;

Fig. 8 is a view similar to Fig. 2 showing a modification of my invention;

Fig. 9 is a front view partly broken away showing the outer member of the modification, and Fig. 10 is a front view partly broken away showing the inner member of my modification.

Referring to the drawings by reference characters I have shown my invention as embodied in a patch vulcanizing apparatus which is indicated generally at 10. As shown in Figs. 1 to 7 my invention is embodied in an apparatus which is adapted to vulcanize a patch such as indicated at 11 upon the interior of a tire casing such as is indicated at 12. As shown my apparatus includes an inner mold member 13 and an outer mold member 14 both of which may be made of suitable material such as an aluminum casting.

The inner member 13 includes an outwardly directed curved segmental wall 15 which is substantially the shape of that of the tire to which it is to be applied. This member 13 includes a recess 16 in its inner wall in which a heating element 17 such as an electrical element 17 is disposed. This element is adapted to be operated by means of current supplied through leads 18 which extend to a plug socket member 19 in a boss 20 on one of the ends of the inner member 13. The inner member includes a longitudinally extending recess 21 in which a thermo-switch 21a is arranged and which as shown in Figs. 3 and 7 is in circuit with the element 17.

The inner member 13 includes a flange 22 which is in alignment with a flange 23 on the inner wall 24 of the outer member 14. The flanges 22 and 23 engage the edge of the bead of the tire and prevent relative movement of the parts at this location. The flange 22 includes a projecting portion 22a which extends over the flange 23 as shown in Fig. 3. The outer member includes an outer wall 25, end walls 26 and a bottom wall 27. The outer member is provided with an aperture 28 through which a bicycle type valve stem 29 of a pneumatic air bag 30 extends. The bag 30 may be inflated through the stem 29.

On the inner face 24 of the member 14 I provide a resilient, rubber pad 31 having a metal frame 31a molded therein adjacent the edges thereof. The frame 31a is provided with a plurality of countersunk apertures 31b and the pad 31 is provided with apertures 31c aligning with the apertures 31b. The pad 31 is secured to the member 14 by screws 31d which are positioned in the apertures 31b of the frame 31a (see Fig. 6).

The member 13 includes a cover 32 which has a boss 33 thereon and the cover is held in place by screws 34. A clamping block 35 is held on the cover 32 by screws 35'. The clamping block includes a projecting post 36 which passes through a collar 37 mounted on a clamping plate 38 which engages a boss 39 on the member 14. The collar 37 is engaged by a removable sleeve 40 which has an integral nut 41 thereon which is threaded on the end 42 of the member 36. The nut 41 is preferably provided with a serrated edge 43 so that it may be readily turned.

In operation the tire casing is arranged as shown in Figs. 2 and 3 with a patch 11 of raw rubber arranged in place against the inner wall of the casing. The inner mold member is then arranged in place contacting this patch while the outer mold member is moved to position and the clamping member is secured in place. The air bag is then inflated thus insuring that a uniform pressure will be applied to the inner wall of the casing thus urging the patch against the heated outer mold member. Current is then supplied to the heating element and is controlled by the thermo-switch 21a until the desired cure is effected.

In Figs. 8, 9 and 10 I have shown a modification of my invention wherein similar parts are indicated by similarly primed reference characters. According to this modification I employ an outer mold member 14' which is solid and which includes an arcuate face 50 which is adapted to engage the outer wall of a tire casing 12'. This outer mold member is provided with a heating element 17' which is similar to the heating element previously described and the outer member is provided with a boss 20' from which leads 19' extend so that current may be supplied to the heating element. The outer member includes a recess 21' in which a thermo-switch 21b is arranged.

The construction is such that the supply of current to the heating element 17' is controlled by the thermo-switch 21a so that when the temperature rises to a certain degree the supply of current will be cut off. In the modification the inner mold member 13' is provided with a mold cavity 51 in which an air bag 30' is arranged. This air bag is adapted to be inflated by means of a stemmed valve member 29'.

The inner and outer mold members are provided with bosses 33' and 39' respectively which are adapted to be engaged by a clamping member which includes a block 35'', a rod 36' and a control nut 41' similar to that previously described.

Having thus described my invention I claim:

1. In a patch vulcanizing apparatus, a mold member comprising an inner member and an outer member, each of said members being of segmental shape and including a portion of a contour to engage the inner wall of a tire casing, one of said members having a recess therein, a heating element disposed in said recess, said one member having a boss thereon, an outlet coupling in said boss, leads extending from said coupling to said heating element, the other member comprising a hollow shell, said other member having a flange and said inner member having a flange, said flanges being adapted to engage a bead on a tire, the flange of one of said members including a part extending over the other flange, said other member including a cavity, an air bag in said cavity, said one member having a closure for said recess, a clamping block on said closure, said block having a rod projecting therefrom, a collar slidable on said rod, said collar having a clamping member thereon engaging said outer member and a nut on said rod engaging said collar.

2. In a patch vulcanizing apparatus, a mold member comprising an inner member and an outer member, said inner member being of segmental shape and including an inner portion of a contour to engage the inner wall of a tire casing, said inner member having a recess therein, a heating element disposed in said recess, said inner member having a boss thereon, an outlet coupling in said boss, leads extending from said coupling to said heating element, said outer member comprising a hollow shell having end walls which conform to the outer surface of a tire casing, said outer member including a cavity, an air bag in said cavity, said inner member having a closure extending over said recess, a clamping block on said closure, said block having a rod projecting therefrom, a collar slidable on said rod, said collar having a clamping member thereon engaging said outer member and a nut on said rod engaging said collar.

3. In a patch vulcanizing apparatus, a mold member comprising an inner member and an outer member, said inner member being of segmental shape and including an inner portion of a contour to engage the inner wall of a tire casing, said inner member having a recess therein, a heating element disposed in said recess, said inner member having a boss thereon, an outlet coupling in said boss, leads extending from said coupling to said heating element, said outer member comprising a hollow shell having end walls which conform to the outer surface of a tire casing, said outer member having a flange and said inner member having a flange, said flanges being adapted to engage a bead on a tire, said inner member having its flange extending over the flange on the outer member, said outer member including a cavity, an air bag in said cavity, said inner member having a closure extending over said recess, a clamping block on said closure, said block having a rod projecting therefrom, a collar slidable on said rod, said collar having a clamping member thereon engaging said outer member and a nut on said rod engaging said collar.

4. In a patch vulcanizing apparatus, a mold member comprising an inner member and an outer member, said inner member being segmental and including an inner portion of a contour to engage the inner wall of a tire casing, said inner member having a recess therein and having a groove communicating with the recess, a heating element disposed in said recess, a thermo-switch in said recess, said inner member having an outlet coupling therein, leads extending from said coupling to said heating element, said outer member comprising a hollow shell having segmental end walls which conform to the outer surface of a tire casing, said outer member including a cavity, an air bag in said cavity, means extending through the wall of said outer member whereby the air bag may be inflated, said inner member having a closure extending over said recess, said closure having a boss thereon, a clamping block engaging said boss, means passing through said clamping block and said boss to hold the parts assembled, said clamping block including an end portion engaging the arcuate inner wall of said inner member, said block having a rod projecting therefrom, a collar slidable on said rod, said collar having a clamping member thereon, said outer member having a boss engaging said clamping member, a sleeve on said rod, the end of said rod being threaded and a nut integral with said sleeve and engaging said threaded end of the rod.

5. In a patch vulcanizing apparatus, a mold member comprising an inner member and an outer member, said inner member being segmental and including an inner portion of a contour to engage the inner wall of a tire casing, said inner member having a recess therein and having a groove communicating with said recess, a heating element disposed in said recess, a thermo-switch in said groove, said inner member having a boss thereon, an outlet coupling in said boss, leads extending from said coupling to said heating element through said switch, said outer member comprising a hollow shell having segmental end walls which conform to the outer surface of a tire casing, said outer member having an arcuate inner flange and said inner member having an arcuate outer flange, said flanges being adapted to engage a bead on a tire, said inner member having a supplemental flange extending over the flange on the outer member, said outer member including a central cavity, an air bag in said cavity, means extending through the wall of said outer member whereby the air bag may be inflated, said inner member having a closure extending over said recess, said closure having a boss thereon, a clamping block engaging said boss, means passing through said clamping block and said boss to hold the parts assembled, said clamping block including an end portion engaging the arcuate inner wall of said inner member, said block having a rod projecting therefrom, a collar slidable on said rod, said collar having a clamping member thereon, said outer member having a boss engaging said clamping member, a sleeve on said rod, the end of said rod being threaded and a nut integral with said sleeve and engaging said threaded end of the rod.

6. In a patch vulcanizing apparatus, a mold member comprising an inner member and an outer member, said inner member being of segmental shape and including an inner portion of a contour to engage the inner wall of a tire casing, said inner member having a recess therein, a heating element disposed in said recess, said inner member having a boss thereon, an outlet coupling in said boss, leads extending from said coupling to said heating element, said outer member comprising a hollow shell having end walls which conform to the outer surface of a tire casing, said outer member having a flange and said inner member having a flange, said flanges being adapted to engage a bead on a tire, said outer member including a cavity, an air bag in said cavity, said inner member having a clamping block thereon, said block having a rod thereon, a clamping plate on said rod and engaging said outer member and means on said rod engaging said clamping plate.

FLOYD E. KITE.